United States Patent [19]

Fontrier

[11] 4,268,199

[45] May 19, 1981

[54] TRAILER FOR THE AUTOMATIC LOADING AND UNLOADING OF ROUND BALES

[75] Inventor: Albert D. Fontrier, c/o Benac-Berdoues, France

[73] Assignee: Ets Benac & Fils S.A., France

[21] Appl. No.: 25,993

[22] Filed: Apr. 2, 1979

[30] Foreign Application Priority Data

Apr. 11, 1978 [FR] France .................................. 78 10603
Sep. 4, 1978 [FR] France .................................. 78 25371

[51] Int. Cl.³ .......................... A01D 87/12; B60P 1/50
[52] U.S. Cl. .................................. 414/24.5; 414/111; 414/551; 414/704; 414/501
[58] Field of Search ............... 414/24.5, 24.6, 44, 414/111, 434, 435, 436, 501, 551, 704

[56] References Cited

U.S. PATENT DOCUMENTS

| | | | |
|---|---|---|---|
| 2,704,164 | 3/1955 | David | 414/551X |
| 2,790,564 | 4/1957 | Rockwell | 414/551 |
| 3,870,339 | 3/1975 | Goff | 414/495 X |
| 4,050,598 | 9/1977 | Schurz | 414/24.5 X |
| 4,103,794 | 8/1978 | Shaw | 414/501 |

FOREIGN PATENT DOCUMENTS

| | | | |
|---|---|---|---|
| 163386 | 6/1955 | Australia | 414/551 |
| 1011297 | 5/1977 | Canada | 414/24.5 |
| 2239193 | 2/1975 | France | 414/434 |
| 1268158 | 3/1972 | United Kingdom | 414/551 |

*Primary Examiner*—Leslie J. Paperner

[57] ABSTRACT

A trailer for loading and transporting cylindrical bales of straw fodder or other materials, of the type having an off-set draw-bar, comprising a chasssis supported by wheels, a main platform integral with this chassis, a fork articulated in the region of the front edge of the main platform and pivotable between a low bale pick-up position, in which the free end of the fork is close to the ground, and a high loading position, in which the free end of the fork is above the plane of the main platform, a control member capable of assuming a first or second state and a drive member controlled by said control member, causing the fork to pivot upwards when the control member is in its second state, and allowing the fork to pivot downwards when the control member is in its first state.

This trailer comprises furthermore a sensing member, of a type known per se, operationally connected to the control member for sensing the presence of a bale on the fork in the low position, and causing consequently the movement of the control member towards its second state.

7 Claims, 23 Drawing Figures

TRAILER FOR THE AUTOMATIC LOADING AND UNLOADING OF ROUND BALES

BACKGROUND OF THE INVENTION

1. Field of the Invention

The present invention concerns a trailer for loading and transporting cylindrical bales of straw fodder or other materials, of the type having an offset draw-bar, comprising a chassis supported on wheels, a main platform integral with this chassis, a fork pivotably mounted proximate the front edge of the main platform and able to pivot between a low bale pick-up position, in which the free end of the fork is proximate the ground, and a high loading position, in which the free end of the fork is above the plane of the main platform, a control member able to assume a first or a second state and a drive member controlled by said control member, causing the fork to pivot upwards when the control member is in its second state, and allowing the fork to pivot downwards when the control member is in its first state, characterized in that it comprises further a sensing member, of a type known per se, operationally connected to the control member, able to sense the presence of a bale on the fork in the low position, and to cause accordingly the movement of said control member to its second state.

2. Description of the Prior Art

There exist at the present time trailers for transporting bales of fodder, provided with mechanisms for loading these bales.

However, the loading mechanisms in question are controlled by an operator or require reversing of the trailer, so that the loading operation requires of the operator a number of manoeuvres which are time-consuming and tire this operator needlessly.

SUMMARY OF THE INVENTION

The present invention aims at eliminating these disadvantages by proposing a trailer for the automatic loading of cylindrical bales.

The trailer of the present invention is essentially characterized in that it comprises furthermore a sensing member, of a type known per se, operationally connected to the control member, able to sense the presence of a bale on the fork in the low position and to cause accordingly the movement of said control member towards its second state.

For example the sensing member is a first articulated lever projecting in front of the fork, urged towards a rest position by a spring, and able to be moved from this rest position by a bale on the fork, this lever causing, when it is moved from its rest position, the operation of the valve of a hydraulic circuit, forming said control member, this valve then moving from its first to its second state, and supplying a tipping jack forming said drive member.

Preferably, a locking lever is mounted on the chassis for preventing the valve from returning to its first state as soon as it has been actuated, and an unlocking lever movable with the fork frees the locking lever and allows the valve to return to its first state for a position of the fork intermediate its low and high positions.

Since the round bales have a tendency, when the trailer is moved over the field at a certain speed, to bounce on the fork which picks them up from the ground and to escape from this latter when it pivots towards its loading position, the trailer comprises furthermore advantageously a transverse retaining rake pivotably mounted about a transverse horizontal axis at the front of the trailer, for retaining, before they are loaded, the bales picked up by the fork, this rake assuming an initial position jamming the bale in response to the action of the sensor, at the latest simultaneously with the beginning of the upward pivoting movement of the fork.

Preferably, the rake is pivotably mounted above the fork, by means of two lateral arms articulated on the chassis, the minimum distance between this rake and its pivoting axis being greater than the diameter of a bale, this rake being linked, in its upward pivoting movement, with the pivoting movement of the fork and pivoting from top to bottom between its initial low jamming position in which this rake encompasses the upper front part of the bale, and an uppermost release position in which the bale during loading escapes rearwards to the rake, this rake pivoting from top to bottom, at least under the effect of its weight, on the one hand, between said releasing position and a waiting position in which the minimum distance between the rake and the ground is greater than the diameter of the bale, and, on the other hand, between said waiting position and said initial jamming position, the rake being stopped in its waiting position, during its downward pivoting movement from its releasing position, by means of a flat bolt, retractable in the other direction, the opening of this bolt being controlled by the bale sensor in response to the sensing of the picking up by the fork of a bale placed on the ground.

The rake may advantageously control, proximate its initial jamming position, the operation of the fork drive member, this operation being interrupted when the fork is proximate its uppermost position.

For this purpose, for example, the sensing lever capable of tipping under the impact of a bale picked up by the fork is pivotably mounted on the fork and, the movement of this lever is transmitted to the bolt to actuate it, which frees a stop integral with one arm of the rake, this latter thus being able to freely pivot from top to bottom to its initial jamming position. On the other hand, one of the arms of the rake comprises a pusher moving, on completion of the pivoting movement of the rake from its waiting position to its initial jamming position, a linkage itself actuating, against a first spring, and through a second spring, the valve inserted in the high pressure fluid supply circuit of the jack, forming the drive member, for opening this valve.

Finally, for example, a wedge, forming a locking lever, rotatably mounted on the chassis, continually urged towards a wedging position and integral with an unlocking lever, is mounted in close proximity to the linkage of the valve, so as to, after this latter has been moved by the pusher, assume its wedging position and to secure this linkage against motion, the unlocking lever being disposed proximate the body of said jack, one end of which is rotatably mounted on the chassis and whose other end describes an arc of a circle during the pivoting movement of the fork, the body of the jack moving the unlocking lever when the fork approaches its uppermost position, sa as to move the wedge from its wedging position and to allow the linkage to return under the effect of the first spring.

The trailer may comprise, besides the main platform, at least one other platform having substantially the same area, each other platform being movable for example by means of hydraulic jacks between a low rest position on the main platform and a high position in which this platform is substantially parallel to the main platform and separated therefrom by a distance substantially equal to a whole multiple of the diameter of the cylindrical bales.

Preferably, a chain conveyor is installed under the main platform, at least in the front part thereof, assuming a longitudinal position in relation to the trailer and travelling to the rear thereof, this conveyor having drive teeth passing through the main platform and contacting the bales placed on this platform; a control mechanism, coupled to the fork, provides for the operation of the conveyor during the movements of the fork and its stopping when this latter is at rest.

The main platform may, moreover, slope rearwards of the trailer and this latter may comprise, at the level of the main platform and thereacross, retractable retaining needles directed upwardly and rearwardly of the trailer, allowing the bales to move rearwardly of the trailer but preventing them from moving forwards.

So as to allow the fork to absorb, without damage, unevennesses in the ground, this fork may comprise a main arm and an end arm, these two arms being articulated to each other and forming an obtuse angle whose opening may vary resiliently about an average value determined by a spring connecting the two arms.

Preferably, the lower part of the vertical rear wall of the trailer is articulated proximate the rear edge of the main platform and may be lowered to form an unloading ramp.

BRIEF DESCRIPTION OF THE DRAWINGS

A particular embodiment of the invention will be described hereafter, by way of indication of and in no wise limiting, with reference to the accompanying drawing in which:

FIGS. 5A to 5J represent schematically the steps for loading the trailer.

DESCRIPTION OF THE PREFERRED EMBODIMENTS

There will first of all be described the trailer shown in FIGS. 1 to 7B, which, not fitted with a rake, forms the simplest embodiment of the invention.

The invention concerns a trailer 1 for automatically loading and transporting cylindrical bales of fodder 2, comprising a chassis or structure 3 supported by a double axle with wheels 4 and a main platform 5 integral with this chassis.

Figure 1:
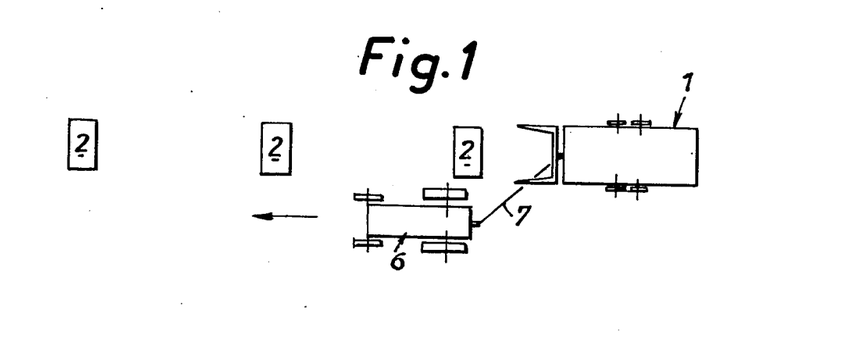
FIG. 1 is a top view showing schematically the method of towing the trailer of the invention, not fitted with a rake.

The trailer moves over the field, drawn by tractor 6 with drawbar 7 offset so that the operator has perfect visibility of the bales to be loaded (FIG. 1).

This trailer comprises: a fork 8 pivotably mounted in the region of the front edge 5a of the main platform 5 and able to pivot between a low bale pick-up position, in which the free end 8a of fork 8 is proximate the ground (see FIG. 5A) and a high loading position (see FIG. 5C) in which the free end 8a of the fork 8 is above the plane of the main platform 5; a sensing member 9 responsive to the presence of a bale 2 on the fork 8 in the low position and able to cause the actuation of a control member 10 which assumes a second or a first state according as to whether it is actuated or not; and a drive member 11 controlled by the control member for pivoting the fork from its low position to its high position when a bale has been sensed on the fork by the sensing member.

This sensing member may be, for example, in the form of a lever bent towards the rear of the trailer, projecting above the fork in the low position, pivotably mounted about a transverse horizontal pin 12 integral with the chassis 3 and urged towards a rest position (that of FIG. 3) by a spring 13 bearing on chassis 3.

Integral with lever 9 is the rod 14 of a valve 10, forming the control member discussed above. The movements of lever 9 are transmitted to rod 14 through springs 15 for making this transmission more smooth and flexible. Valve 10 is placed in a pressurized fluid circuit supplied for example by the tractor, and admits this fluid through its inlet 10a. The outlet 10b of valve 10 is connected to a jack 11 forming the drive member discussed hereabove. This jack is pivotably mounted about a pin 16 on chassis 3 and can cause the pivoting movement of fork 8 with which it is interlocked, for pivoting about a pin 17 proximate the pivot axis of this fork.

When a bale 2 is present on fork 8 (see FIG. 5B) it pushes lever 9 backwards which, through rod 14, acts on valve 10. Valve 10, which in its rest position, closes the hydraulic circuit, then changes its state and supplies jack 11 which raises fork 8 (FIGS. 4 and 5C), which, in its turn, loads the bale 2 on the trailer.

Figure 3:
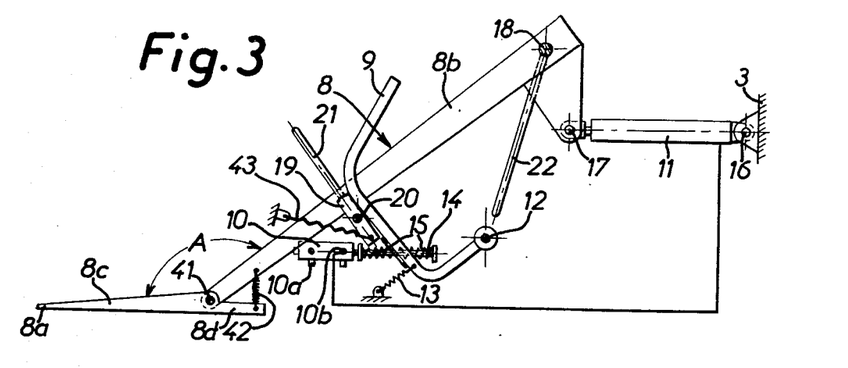
FIG. 3 is a side view of the automatic loading mechanism in its rest condition for the trailer without rake.

In the rest position, FIG. 3, lever 9 bears on a locking lever 19 rotatably mounted about a horizontal transverse pin 20 integral with chassis 3 and located under fork 8 in the rest position.

A follower lever 21, disposed laterally in relation to the trailer, outside the fork, is fixed in rotation with lever 19. Levers 19 and 21 tend, from their rest position (FIG. 3), to tilt downwards and rearwards of the trailer under the effect of spring 43 fixed to chassis 3.

Figure 4:
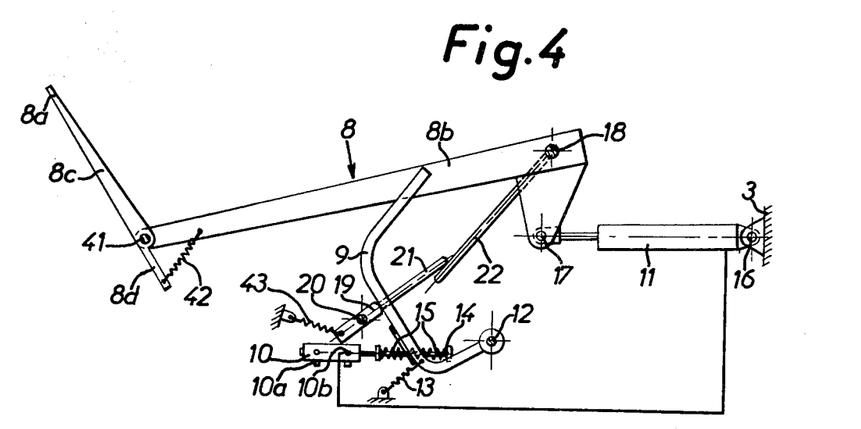
FIG. 4 is a lateral view of the automatic loading mechanism during operation, of the trailer without rake.
Figure 5A:
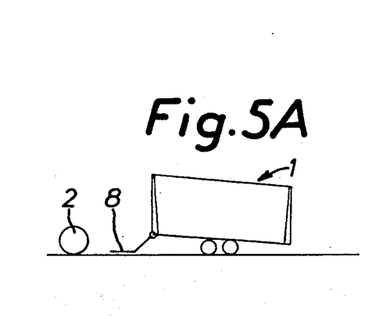
Figure 5B:
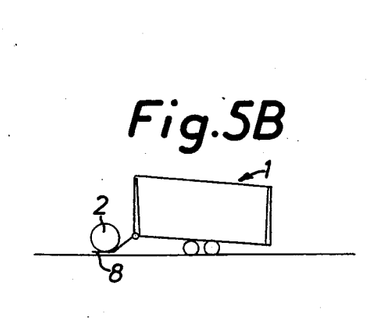
Figure 5C:
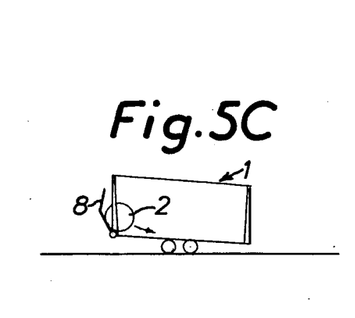

When, under the effect of a bale (FIG. 5B), lever 9 is pushed rearwardly, levers 19 and 21 also pivot rearwardly (FIG. 4) and the locking lever 19 prevents the sensing lever 9 from returning, so that jack 11 continues to be supplied through the valve and fork 8 rises (FIG. 5C).

Figure 5D:
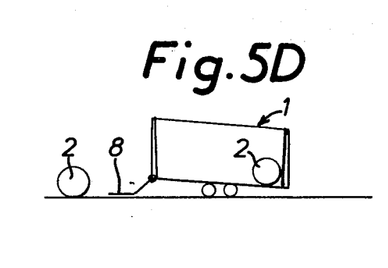
Figure 5E:
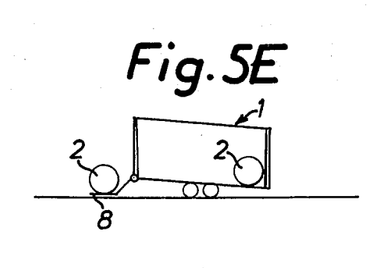
Figure 5F:
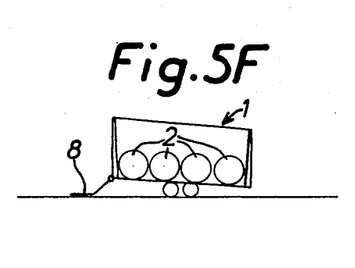
Figure 5G:
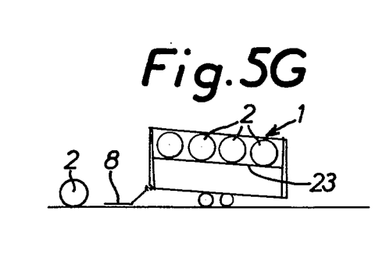
Figure 5H:
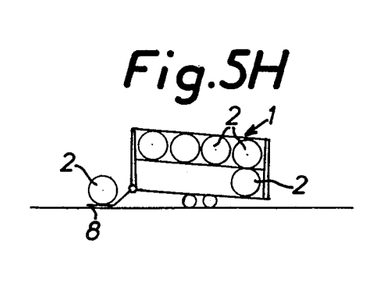

In a certain position of the fork, an unlocking lever 22, fixed in rotation with the fork, pushes the follower lever 21 upwards, so that the unlocking lever 19 releases lever 9 which returns to its rest position. Valve 10 then ceases to supply jack 11 and the fork returns to its low position under the effect of its weight (FIG. 5D). The trailer is then ready to load other bales (FIGS. 5E,5F).

Preferably, trailer comprises, besides the main platform 5, a mobile platform 23 having substantially the same area. This platform 23 is interlocked with four vertical hydraulic jacks bearing on chassis 3 and capable of moving this platform 23 between a low position in which it rests on the main platform 5 (FIG. 2) for loading thereof and a high position (FIG. 5G) in which it is separated from the main platform 5 by a distance at least equal to the diameter of the bales, so as to allow new bales to be loaded on the main platform (FIGS. 5H and 5J) and the bales placed on the mobile platform to be stacked.

Moreover, it is provided for the main platform to slope rearwardly of the trailer so as to allow easier loading and unloading of the bales. The loading may also be facilitated by the presence of an inclined rolling surface 25 in the region of the front edge of the main platform 5.

Finally, there may also be provided, for facilitating loading, a chain conveyor 26 which is installed under the main platform at least in the front part thereof. This longitudinal conveyor has drive teeth 27 appearing through the main platform 5, as well as through the mobile platform 23 when this latter is in the low position. These teeth 27 obviously function to drive the loaded bales towards the rear of the trailer.

So that the teeth 27 do not destroy the loaded bales, a control mechanism is provided for operating the conveyor intermittently.

Figure 6:
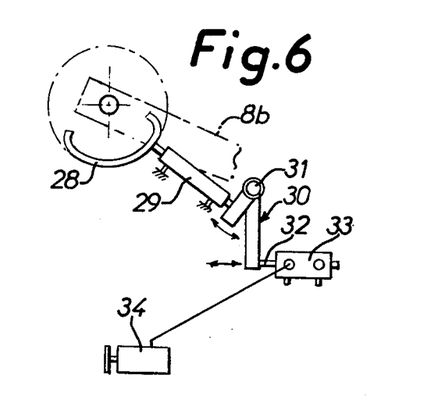
FIG. 6 shows the mechanism for controlling the chain conveyor.

This mechanism, shown in FIG. 6, comprises a cam 28 fixed in rotation with fork 8. This cam bears, through an intermediate device comprising a slide 29 and a bell-crank lever 30 pivoting about a pin 31, on rod 32 of a valve 33 fed with high pressure fluid and controlling the supply of the hydraulic motor 34 driving the conveyor 26. The cam is given, in a way known per se, a profile such that the motor 34 is only fed during the upward and downward movements of fork 8.

Figure 7A:
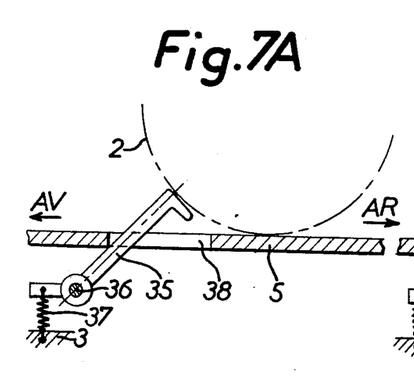
FIGS. 7A and 7B are schematical sectional view of the main platform of the trailer, showing the retaining needles.
Figure 7B:
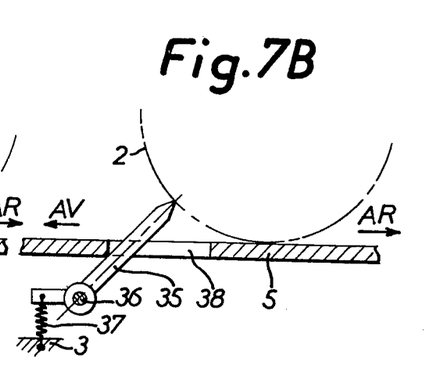

As shown in FIGS. 7A and 7B, retractable retaining needles 35 are provided at the level of the main platform 5. These needles 35 pass through the main platform 5 and, when it is in its low position, the mobile platform 23. These needles 35, directed upwards and towards the rear of the trailer, are each pivotably mounted about a transverse horizontal pin 36 and are urged to their raised position by means of return springs 37 fixed to chassis 3. The pivoting of these needles towards the front of the trailer is prevented, for example by the abutment of these needles against platform 5. On the other hand, elongated apertures 38 are provided in platforms 5 and 23 to allow the needles to retract by lying rearwardly. Needles 35 thus allow the bales to move towards the rear AR of the trailer and prevent them from moving towards the front AV.

Figure 2:
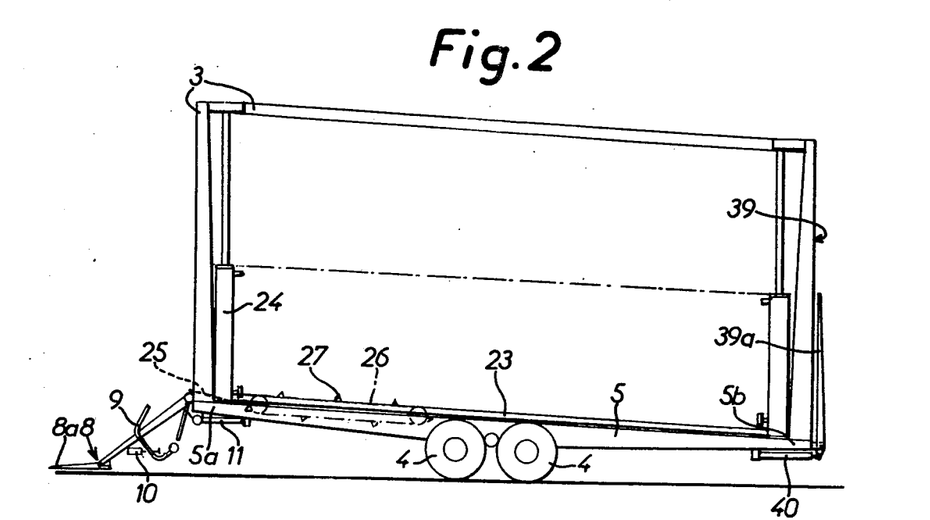
FIG. 2 is a schematic side view of the trailer of the invention, not fitted with a rake.

In FIG. 2, it can be seen that the lower part 39a of the rear vertical wall 39 is articulated in the region of the rear edge 5b of the main platform and may be lowered, by means of a jack 40, to form an inclined unloading rap. Because of the slope of platform 5, it is then sufficient to lower ramp 39a to obtain the automatic discharge of the bales placed on the main platform 5. Then all that is required is to lower the mobile platform 23 to unload it in the same manner.

Figure 5J:
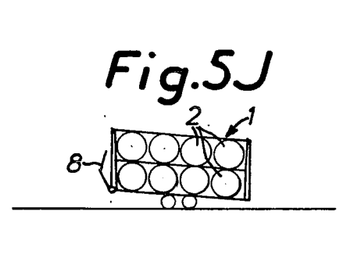

As shown in FIG. 5J, the front fork is, by direct control of jack 11, raised for transport, so as to jam, with ramp 39a, the bales placed on the main platform 5. The bales placed on mobile platform 23 are naturally jammed by the structure 3 of the trailer and of the racks which surround it, in a way known per se.

Preferably, as shown in FIG. 2 to 4, the fork 8 is constructed from two parts articulated to one another, and more precisely in the form of a main arm 8b and an end arm 8c.

Arm 8c has, beyond the joint 41 with arm 8b, a projection 8d connected to the main arm 8b by means of a spring 42. Thus, the obtuse angle A formed by arms 8b and 8c may vary resiliently about an average value, which allows the fork 8 to absorb without damage the impacts due to unevenness of the ground.

FIG. 8 to 14 show a trailer having the same function of automatic pick-up of cylindrical bales as the trailer previously described and able to incorporate furthermore the storage features shown in FIGS. 2, 5A to 5J and 7A, 7B, but which is in addition provided with a bale retaining member or rake, for preventing the bales from bouncing on the fork at pick-up. The presence of this rake allows the mechanism for triggering off the raising of the fork to be designed in a form different in detail, through equivalent.

In FIGS. 8 to 12 there is shown such a trailer R1 (the letter "R" applying to the references to FIGS. 8 to 14 relating to the trailer fitted with a rake) comprising a chassis R2, wheels R3, to fork R4, a bale sensor R5, a jack R6 forming the drive member for the fork, and a retaining rake R7. The term "rake" must not be understood in a restrictive sense, designating a tool having a cross-piece and teeth, but covers any member able to retain, through a certain contact area, a bale of fodder or similar material.

Figure 8:
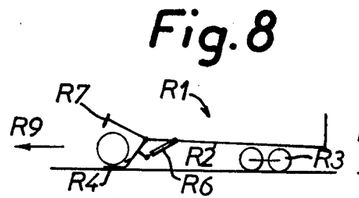
FIGS. 8 to 12 are schematic views of the trailer, fitted with a fork and a retaining rake, in the different phases of loading a bale.
Figure 13:
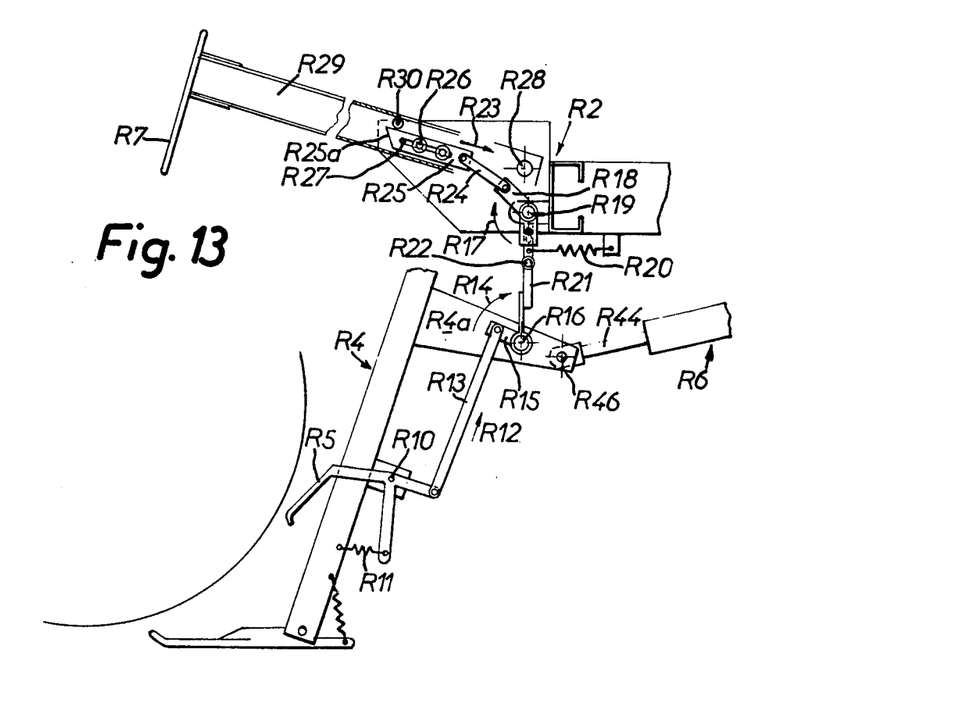
FIG. 13 is a schematic side view showing a part of the trailer, with the fork in the low pick-up position and the rake in the waiting position, as in FIG. 12.

In a simple embodiment shown in FIG. 13, this rake is formed by a transverse flat element (seen on end in FIG. 13), pivotably mounted on chassis R2 about a pin R28 by means of two longitudinal and lateral arms R29, each arm being disposed on a corresponding side of the trailer. As shown in FIGS. 8 and 13, the rake is pivotably mounted above the fork.

In FIG. 8 there is shown a trailer whose fork R4 is about to pick up a cylindrical bale R8 placed on the ground. In this FIG. and in FIG. 13, the rake R7 is in its waiting position, in which its distance from the ground is greater than the diameter of a bale.

Because of the advance of the trailer in the direction of arrow R9, and because of the inertia of the bale, this latter bears, when it is picked up, on the bale sensor R5.

This bale sensor R5, as shown in FIG. 13, is a projecting lever, rotatably mounted on the fork about a pin R 10 and urged to its projecting position by means of a spring R 11. The tipping of the sensor R5 by the bale causes the movement R 12 of the articulated link R13, the movement R 14 of a first cranked lever R 15 mounted on the fork about a pin R 16, the movement R 17 of a second cranked lever R 18 rotatably mounted on chassis R 2 about a pin R 19, this second cranked lever R 18 being continually urged towards its initial position by a spring R 20 and connected to the first cranked lever by means of a lever R 21 pivoting about a pin R 22 integral with the chassis, the tipping of sensor R 5 causing finally the movement R 23 of a link R 24 articulated to lever R 18, and of a bolt 25 on which pivots link R 24.

Bolt R 25 is slidably mounted on chassis R2, for example by means of guide studs R 26 fixed in relation to the chassis and a longitudinal slot in this bolt in which are engaged the guide studs R 26. This bolt forms, with a roller R30 firmly fixed to arm R29 of the rake and forming an abutment, a locking bolt for locking the rake in its waiting position.

Figure 9:
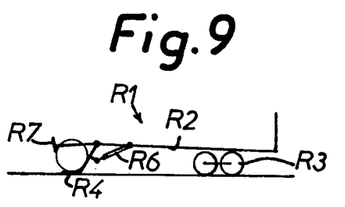

The movement R 23 of bolt R 25, caused by the tipping of sensor R 5, results precisely in the opening of the bolt by releasing roller R 30, which causes rake R7 to fall to an initial position for jamming the bale shown in FIG. 9. The downward pivoting movement of the rake may be simply provided by gravity. In its initial jamming position, rake R7 bears on the front upper part of the bale, as shown in FIG. 9.

Figure 14:
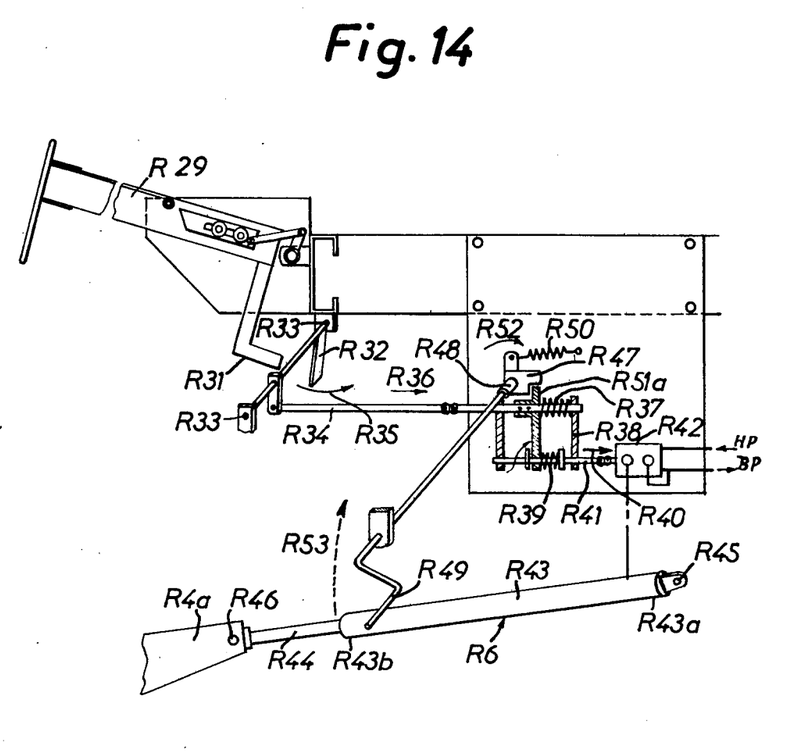
FIG. 14 is a schematic view showing a part of the trailer with the rake ready to pivot downwards, and the linkage seen in perspective.

FIG. 14, which shows the opening of the bolt and the beginning of the fall of the rake, shows the consequences of this fall.

Arm R29 of the rake has a pusher R 31 which is fixed in rotation therewith about pin R 28.

When the rake is in its lowermost position shown in FIG. 9, this pusher R31 bears on a lever R 32 rotatably mounted on the chassis about a pin R 33. This lever R 32, which is connected to a first rod R 34, is subjected to movement R 35 and imparts to this latter movement R 36.

This rod, which is continually urged in the direction opposite to that of movement R 36 by a first spring R 37 bearing on a plate R 38 fixed in relation to the chassis, imparts, by its movement R 36, a movement R 40 to a second rod R 41, through a plate R 51 integral with this first rod R 34 and sliding on the second rod R 41, and a second spring R 39 bearing on this plate R 51 and on this second rod R 41. This latter, which forms the control rod for valve R 42 inserted in a high pressure fluid circuit R 40 supplying jack R 6 of fork R 4, causes, by its movement R 40, the circuit to be opened and jack R 6 to be supplied with high pressure liquid.

To prevent rod R41 from returning in the direction opposite its movement R40, it is provided with a wedge R47 rotatably mounted on the chassis about a pin R48, this wedge forming a locking lever, being integral with an unlocking lever R49 and being continually urged towards a wedging or locking position by means of a return spring R50 fixed to the chassis and working under traction.

As soon as pusher R31 has imparted to rod R30 and to plate R51 their movement R36, spring R50 imparts to wedge R47 a movement R52 in the direction of a wedging or locking position, in which this wedge bears on face R51a of plate R51, preventing the return of rod R41.

Figure 10:
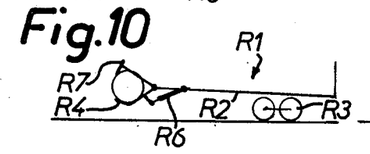
Figure 11:
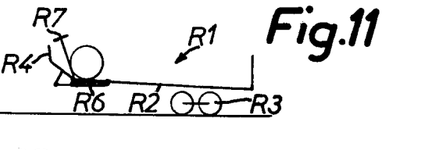
Figure 12:
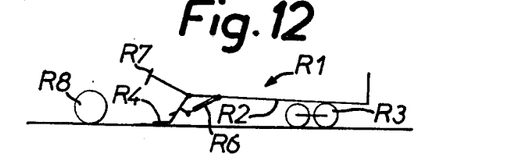

Jack 62, being fed, causes the fork to pivot upwards, in the direction of its loading position, as shown in FIG. 10.

During this phase, the rake remains resting on the bale and itself performs an upward pivoting movement resulting from the transmission by the bale of the movement of the fork.

On the other hand, during this phase, roller R30, integral with arm R29, must pass freely from a position in which it is below bolt R 25 to a position in which it is above this latter. This is obtained by giving to edge 25a of a bolt a sloping profile, so that the roller may push the bolt back when the rake pivots from bottom to top, and solely in this pivoting direction.

As the end R43a of body R43 of jack R6 opposite rode R44 of this latter, is rotatably mounted on the chassis about a pin R45, rod R44 being itself directly articulated to an extension R4a of the fork about a pin R 46, jack R6 pivots upwardly (FIGS. 10 and 11) while it causes the fork to pivot, its end R43b describing an arc of a circle R52 (FIG. 14).

At the beginning of the upward pivoting movement of the fork and the rake (FIG. 14), pusher R31 frees itself from lever R32, valve R42 remains open because rod R41 is jammed by the tipping wedge R47.

As the rake pivots upwardly towards its uppermost release position (FIG. 11), the bale advances under the rake and frees itself from this latter rearwardly.

At the end of the upward pivoting movement of the fork and the rake (FIG. 11), valve R42 must obviously be closed to allow the fork and the rake to return to the positions which they occupy in FIG. 8. This is achieved by the contact of the body R43 of jack R6 with unlocking lever R49. At the end of its movement R53, body R43 of the jack pushes lever R49 upwardly which causes wedge R47 to move in a direction opposite that of movement R52. Plate R51 then assumes, under the action of spring R37, the position shown in FIG. 14 and valve R42 cuts off the high pressure supply to the jack which empties at low pressure (BP) under the effect of the weight of the fork, which returns to its low position. The rake accompanies the fork in its downward pivoting movement until roller R30 abuts bolt R25 and secures the rake against motion in its waiting position.

As an examination of FIGS. 8 to 12 shows, the pivoting axes of the fork and the rake are very close to one another and preferably are merged. Furthermore, the distance between rake R7 and its pivoting axis must be greater, in the embodiment described, than the diameter of a bale (FIG. 11), but less than the distance separating the pivoting axis of the rake from the further point from the periphery of a bale picked up by the fork in its lowermost position (FIG. 8).

The position of the rake must be preferably enveloping so as to positively lock the bale. If the action of the rake is limited to the upper front part of the bale, this latter may possibly escape forwards and become jammed between the rake and the end of the fork. The rake must then be designed so that a contact point with the bale is at the level of or below the centre of the bale.

It is moreover to be understood that the embodiment described has been given by way of example and that modifications accessible to a person skilled in the art may be made thereto without departing from the spirit and scope of the invention.

What is claimed is:

1. A loader for automatically loading forage bales comprising a frame supported by wheels, a main platform carried by said frame, at least one secondary platform movable parallel to said main platform, a bale pick-up fork pivoted to the front edge of said main platform and movable from a lower position for picking up bales lying on the ground to an upper position in which the bales are loaded on said main platform, a pivotably mounted lever, spring means for normally urging said lever to an inoperative position ahead of said fork for detecting the presence of a bale, a hydraulic valve responsive to the movement of said lever, a tipping cylinder responsive to said valve and operably connected to said fork to actuate same, a rake pivotably mounted on the front of said frame and above said fork and adapted to retain the bales on said fork, said rake being operably connected to said lever and responsive to the movement of said lever at the very beginning of the pivotal movement of said fork to drop upon the forage bale, and means for transferring the loaded bales towards said platforms.

2. A loader according to claim 1, wherein there is provided a locking arm pivoted to the frame and movable to prevent said hydraulic valve from assuming an inactive condition after it has been actuated by said lever, and a release lever movable in conjunction with said fork to move said locking arm to a releasing position to enable said valve to assume said inactive condition when said fork is intermediate said lower and upper positions thereof.

3. A loader according to claim 1, wherein said rake is pivotable downwards by gravity from a release position to a waiting position in which the minimum distance from the rake to the ground is greater than the bale diameter and between said waiting position and an initial looking position in which it bears on the bale, and there is provided a latch for locking said rake in its waiting position during its downward pivotal movement from said release position, and means responsive to the movement of said lever when the latter detects the picking up of a bale from the ground by said fork to move said latch to a release position.

4. A loader according to claim 3, wherein there is provided means operable by said rake when the latter is in the vicinity of its initial locking position to activate and hydraulic valve to start operation of said tipping cylinder to drive said fork, the operation of said fork being discontinued when it approaches its upper position.

5. A loader according to claim 3, wherein said lever is pivotally mounted on said fork and tilted by a bale picked up by said fork, and said latch comprises a stop member rigid with said rake which is released by said means responsive to the movement of said lever so that the rake can pivot freely downwards to its initial locking position.

6. A loader according to claim 1, wherein said fork comprises a main arm an end arm, said arms being pivoted to each other and forming an obtuse angle, and a spring means interconnects said arms, whereby the value of the obtuse angle may vary resiliently about a mean value determined by the spring means.

7. A loader according to claim 1, wherein there is provided a bale conveyor having driving teeth extending through at least said main platform and a mechanism for controlling said conveyor operatively connected to said fork.

* * * * *